(12) United States Patent
Russell

(10) Patent No.: US 8,117,900 B2
(45) Date of Patent: Feb. 21, 2012

(54) SYSTEMS AND METHODS FOR MONITORING THE INTEGRITY OF A TANK

(76) Inventor: David D Russell, Blodgett, MO (US)

( * ) Notice: Subject to any disclaimer, the term of this patent is extended or adjusted under 35 U.S.C. 154(b) by 85 days.

(21) Appl. No.: 12/510,030

(22) Filed: Jul. 27, 2009

(65) Prior Publication Data

US 2009/0320566 A1 Dec. 31, 2009

Related U.S. Application Data

(63) Continuation of application No. 12/098,233, filed on Apr. 4, 2008, now Pat. No. 7,581,432, which is a continuation of application No. 11/220,173, filed on Sep. 6, 2005, now Pat. No. 7,392,690.

(60) Provisional application No. 60/607,186, filed on Sep. 3, 2004.

(51) Int. Cl.
*G01M 3/04* (2006.01)

(52) U.S. Cl. .......................................... 73/49.2; 73/49.3

(58) Field of Classification Search ............. 73/40, 49.2, 73/49.3
See application file for complete search history.

(56) References Cited

U.S. PATENT DOCUMENTS

| | | | |
|---|---|---|---|
| 3,538,746 A | 11/1970 | Jacobs et al. | |
| 3,848,765 A | 11/1974 | Durkop | |
| 4,373,815 A | 2/1983 | Bruce | |
| 4,607,522 A * | 8/1986 | Sharp ............................. | 73/49.2 |
| 4,648,523 A * | 3/1987 | Strock .......................... | 220/530 |
| 4,653,312 A | 3/1987 | Sharp | |
| 4,672,366 A * | 6/1987 | Butts ............................. | 588/260 |
| 4,739,659 A | 4/1988 | Sharp | |
| 4,796,676 A | 1/1989 | Hendershot et al. | |
| 4,798,496 A | 1/1989 | Sawada | |
| 4,819,821 A | 4/1989 | Sharp | |
| 4,825,687 A | 5/1989 | Sharp | |
| 4,869,386 A | 9/1989 | Sharp | |
| 4,875,361 A | 10/1989 | Sharp | |
| 4,925,046 A | 5/1990 | Sharp | |
| 4,951,844 A | 8/1990 | Sharp | |
| 5,020,358 A | 6/1991 | Sharp | |
| 5,072,623 A * | 12/1991 | Hendershot ..................... | 73/49.2 |
| 5,102,481 A | 4/1992 | Sharp | |
| 5,117,677 A * | 6/1992 | Hendershot et al. ........... | 73/49.2 |
| 5,152,859 A | 10/1992 | Sharp | |
| 5,167,142 A | 12/1992 | Sharp | |
| 5,259,895 A | 11/1993 | Sharp | |
| 5,303,840 A | 4/1994 | Sharp | |
| 5,400,646 A | 3/1995 | Kraus et al. | |
| 5,752,616 A | 5/1998 | Watkinson | |
| 5,816,424 A | 10/1998 | Cannan, Jr. et al. | |
| 6,834,534 B2 | 12/2004 | Halla et al. | |
| 6,886,388 B1 | 5/2005 | McGill et al. | |
| 6,886,390 B2 | 5/2005 | Schneider | |

OTHER PUBLICATIONS

Standard Tank Data / Made-To-Order (MTO) Tank Data, undated, one page.

* cited by examiner

*Primary Examiner* — Daniel Larkin

(57) ABSTRACT

A conduit is connected to the interstice between an outer and inner wall of a storage tank or the liner thereof and may be used to monitor the integrity of the interstice. The conduit comprises a coupling in fluid communication with the interstice, a tube connected at one end to the coupling and having a length sufficient to extend into a riser pipe of the tank. The conduit may also include a bushing holding the tube apart from the tank and providing for the variable positioning of the tube with respect to the tank. A method of monitoring the integrity of the interstice uses monitoring equipment connected to the conduit.

11 Claims, 3 Drawing Sheets

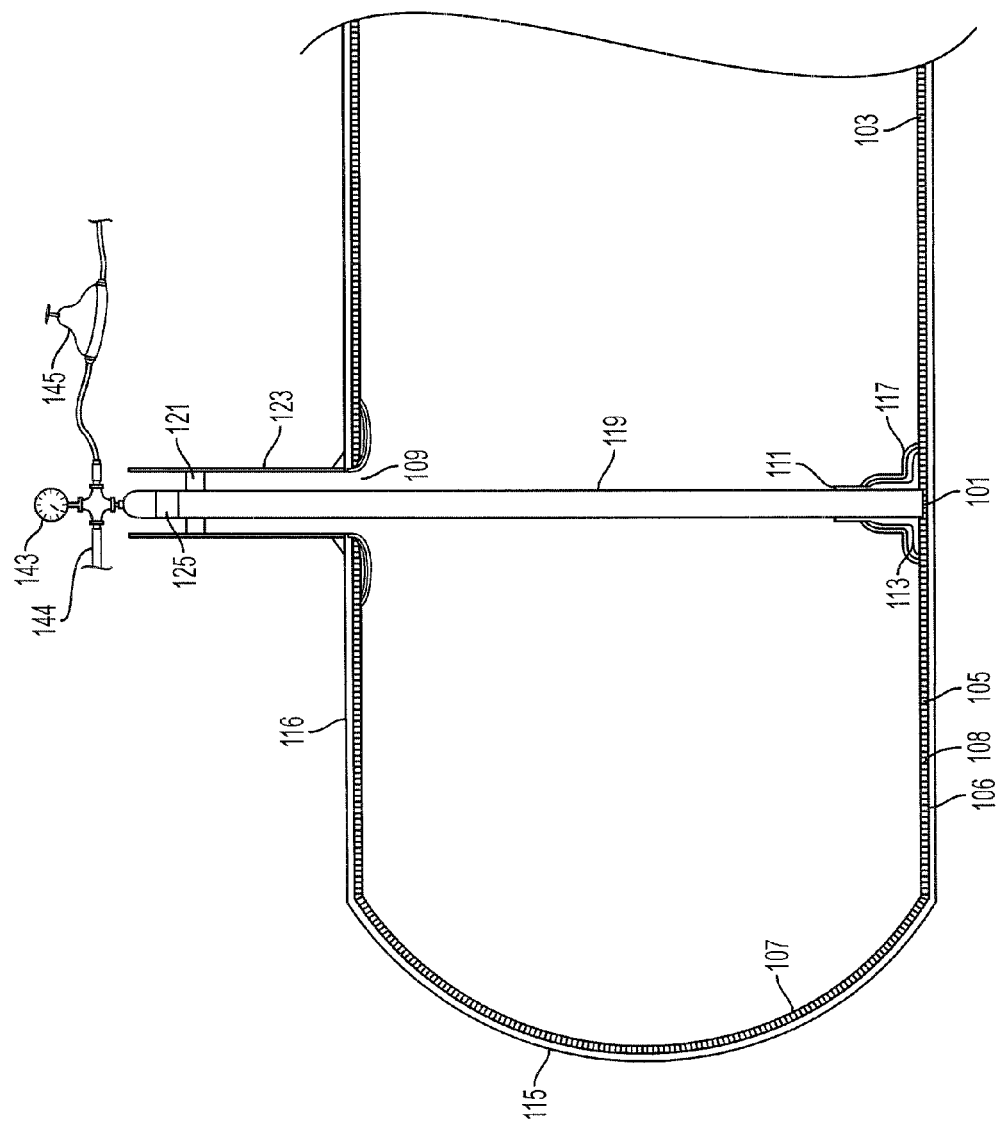

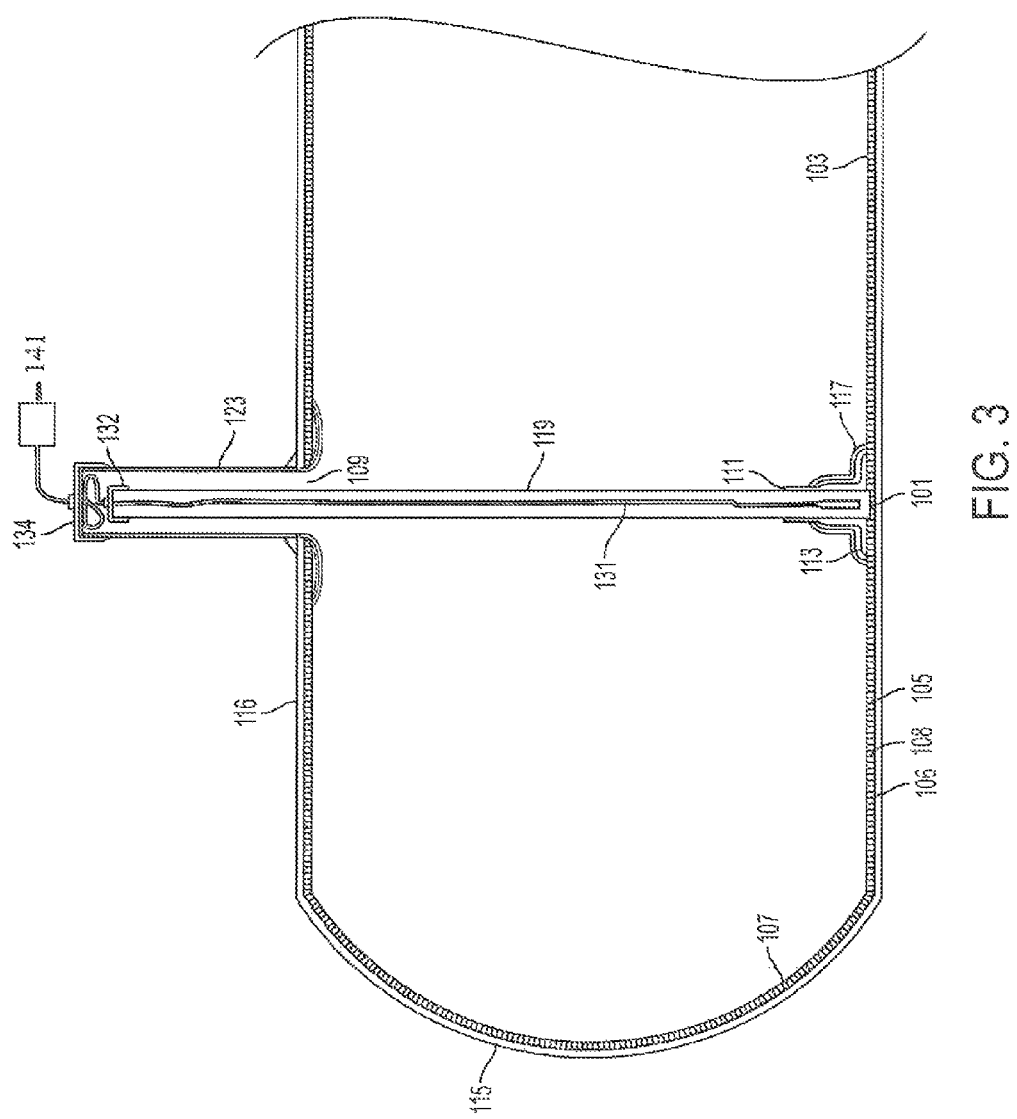

SYSTEMS AND METHODS FOR MONITORING THE INTEGRITY OF A TANK

CROSS REFERENCE TO RELATED APPLICATIONS

This application is a Continuation of U.S. Utility patent application Ser. No. 12/098,233 filed Apr. 4, 2008, now U.S. Pat. No. 7,581,432, which is a Continuation of U.S. Utility patent application Ser. No. 11/220,173 filed Sep. 6, 2005, now U.S. Pat. No. 7,392,690, which in turn claims the benefit of U.S. Provisional Patent Application No. 60/607,186, filed Sep. 3, 2004. The entire contents of all documents are incorporated herein by reference.

BACKGROUND OF THE INVENTION

1. Field of the Invention

This invention relates to an apparatus and a method of making and using the apparatus for monitoring the integrity of a storage tank. In particular, the apparatus provides a conduit connected to the interstice between an inner and outer wall of a tank and connected external to the tank to so as to allow for detection of a breach of the integrity of either the inner or outer wall of the tank.

2. Description of Related Art

Commercial and industrial liquids of all types are stored in underground storage tanks. The tanks are generally cylindrical in shape and usually have a capacity in the range of 500 to 20,000 gallons or more. Such tanks are generally made of either metal (usually steel) or a fiber reinforced resinous material.

Because the liquids stored in such tanks are often hazardous, and thus can cause severe environmental damage and greatly impact the lives of people living, working, and recreating in nearby areas, careful attention to the potential for leaks from such tanks must be exercised. Due to these potential problems from leaks, safer storage tanks have been designed with a double wall, such that a breach in the integrity of either of the inner or outer wall alone will not allow a leak of the liquid contained in the tank. The use of such double-walled tanks (or equivalents thereof, wherein some sort of secondary containment is provided for an otherwise single-walled tank) is increasingly being mandated by government regulation.

In one alternative tank structure that provides added safety from the hazards of leaking storage tanks, a liner is installed in a tank that has been in use and is already in the ground. Certain of these liners can be installed without removing the tank from its underground position, Such a lining can be significantly more economical to install as compared with removal and replacement of the single-walled tank with a new double-walled tank.

In most of the safer structures wherein a tank has a double wall or a liner of some form, there exists a space between the inner wall and the outer wall or the liner and the outer, wall, or in some cases between two walls of the liner. This space is often referred to as an interstice. The interstice is a volume—defined between two walls of the tank, two walls of the liner, or between walls of the tank and the liner—that may be wholly or partially evacuated, may be filled with a gas, such as air, or may be partially or essentially wholly filled with a liquid or solid material. An example of a solid filler material is a fibrous batt.

Because a breach in either of the walls that form the interstice is the first step towards a break in the tank that will allow a leak of the tank's hazardous contents, the monitoring for a breach in one of these walls is an important step to preventing leaks. If the breach of a first wall can be detected, a remedial action can be taken prior to a breach of the second wall that would allow the leak into the external environment. Monitoring for a breach in either an inner or outer wall about the interstice is readily accomplished by monitoring the characteristics of the interstice.

For tanks that are retrofit with an inner tank wall or liner, there have previously been developed at least two methods for allowing monitoring of the interstice. Both methods employ a conduit that is attached to the inside of the tank at the top of the tank directly under an entry bunghole. Additionally, both methods employ a conduit that is rigidly attached to the tank at both of its two ends.

In the first, a generally semicircular conduit is constructed and laid along an inner circumference of the tank from the top to the bottom of the tank, after the inner wall or liner has been constructed in the tank. The conduit covers over both an opening in the liner at the bottom of the tank and an entry bunghole at the top of the tank, providing fluid communication from the interstice through the conduit to the entry bunghole. After placing the conduit along the inside of the tank, a layer of fiberglass and resin is applied over the conduit to secure the conduit in place.

In the second method, the lining is first constructed inside the tank. Then, a straight, fiberglass reinforced polymer (FRP) tube is coupled to the lining at the bottom of the tank at a location where a hole in the lining passes through to the interstice. On an end opposite the bottom of the tank, the tube is connected to a fiberglass sleeve that allows for a further connection to a length of flex hose, which rises the remaining height to the top of the inside of the tank where a double tap bushing is used to rigidly attach the flex hose to the tank through two threaded connections—flex hose to double tap bushing and double tap bushing to tank—directly below an entry bunghole.

Each of these methods has problems that make their use inconvenient, at best. One of the most significant problems with the semi-circular conduit is that it is difficult to get a probe or other monitoring device through the curved conduit after construction is complete. The most efficient manner of installing a probe in the needed location at the bottom of the tank is the use of a specially designed device, called a probe taxi, which delivers the probe through the curved conduit. Use of the taxi, significantly increases the expense of the installation. The second method, using a straight FRP tube, is generally too rigid a construction, even with the use of the flex hose. The conduit (including the double tap bushing, tube, and hose) in this method often does not maintain its closed path, but will break under the stress provided in the normal course of emptying and refilling the tank with liquid. As the tank flexes and its height changes, the tank will apply strain along the longitudinal direction of the conduit that cannot be absorbed by the conduit since the two ends of the conduit are rigidly attached at the top and bottom of the inside of the tank. This longitudinal strain can break the conduit. A broken conduit does not allow for monitoring of the interstice, since as a result of the fluid communication between the conduit path and the interstice, a breach in the conduit is similar to a breach in a wall of the interstice.

SUMMARY OF THE INVENTION

In an embodiment, the invention is a conduit used for monitoring the integrity of a storage tank interstice comprising an opening in an inner surface of the tank, a coupling, and a tube. The coupling has a hole through it that is in fluid communication with the interstice through the opening. The tube is connected at its first end to the coupling so that the open volume through the length of the tube is in fluid communication with the hole through the coupling, and has a sufficient length to extend from the coupling into a riser pipe attached to the tank. The coupling may comprise a flange portion, which may be connected to the inner surface of the tank. In a particular embodiment, the coupling is connected to the inner surface of the tank at a position adjacent to a location in the interstice that is designed to be a low point in elevation.

In an embodiment, the conduit also comprises a bushing. In this embodiment, the bushing is located nearer the second end of the tube than to the first end and connects the tube to the tank, holds the tube apart from the tank, and allows the tube to move relative to the tank. In an embodiment, the bushing of the conduit is made of a material comprising neoprene. Such a bushing may allow the tube to move relative to the tank in response to the varying forces on the tube and the tank during normal use of the tank. Such a bushing may allow the tube to move relative to the tank either up-and-down or side-to-side or both.

In an alternate embodiment, the conduit for monitoring the integrity of the tank further comprises a monitoring system and a coupling means for connecting the tube to the monitoring system. Such a monitoring system may include a source for pressurizing or depressurizing the interstice relative to ambient air pressure. In an alternate embodiment such a monitoring system includes a probe for detecting the presence of or change in the level of a liquid in the vicinity of said probe.

In an embodiment, the tank in which the conduit is installed and used is lined with a multi-layered, resin hardened fabric. In an embodiment, such a fabric has at least two generally parallel surfaces separated by generally perpendicular supports to create an interstice.

In an alternate embodiment, the interstice is created by retrofitting an existing tank with an inner surface not present at the time the tank was originally manufactured. As a still further alternate embodiment, the interstice is an element of the tank as originally manufactured.

Moreover, an alternate embodiment provides means of fluid communication having an end connected to an interstice of a storage tank and another end connected to an element of interstice monitoring equipment, the end connected to the monitoring element not also being rigidly connected to said tank.

A still further embodiment is a method of monitoring the integrity of a storage tank interstice comprising the step of providing a tank having an interstice in fluid communication with a tube having only one of two ends rigidly attached to the tank, and the step of monitoring the contents of said interstice using monitoring equipment connected to said interstice through said tube.

BRIEF DESCRIPTION OF THE DRAWINGS

FIG. 2 shows a cross-sectional view of a second embodiment of a monitoring system assembled in a tank.

FIG. 3 shows a cross-sectional view of a third embodiment of a monitoring system assembled in a tank.

DETAILED DESCRIPTION OF PREFERRED EMBODIMENTS

Figure 1:
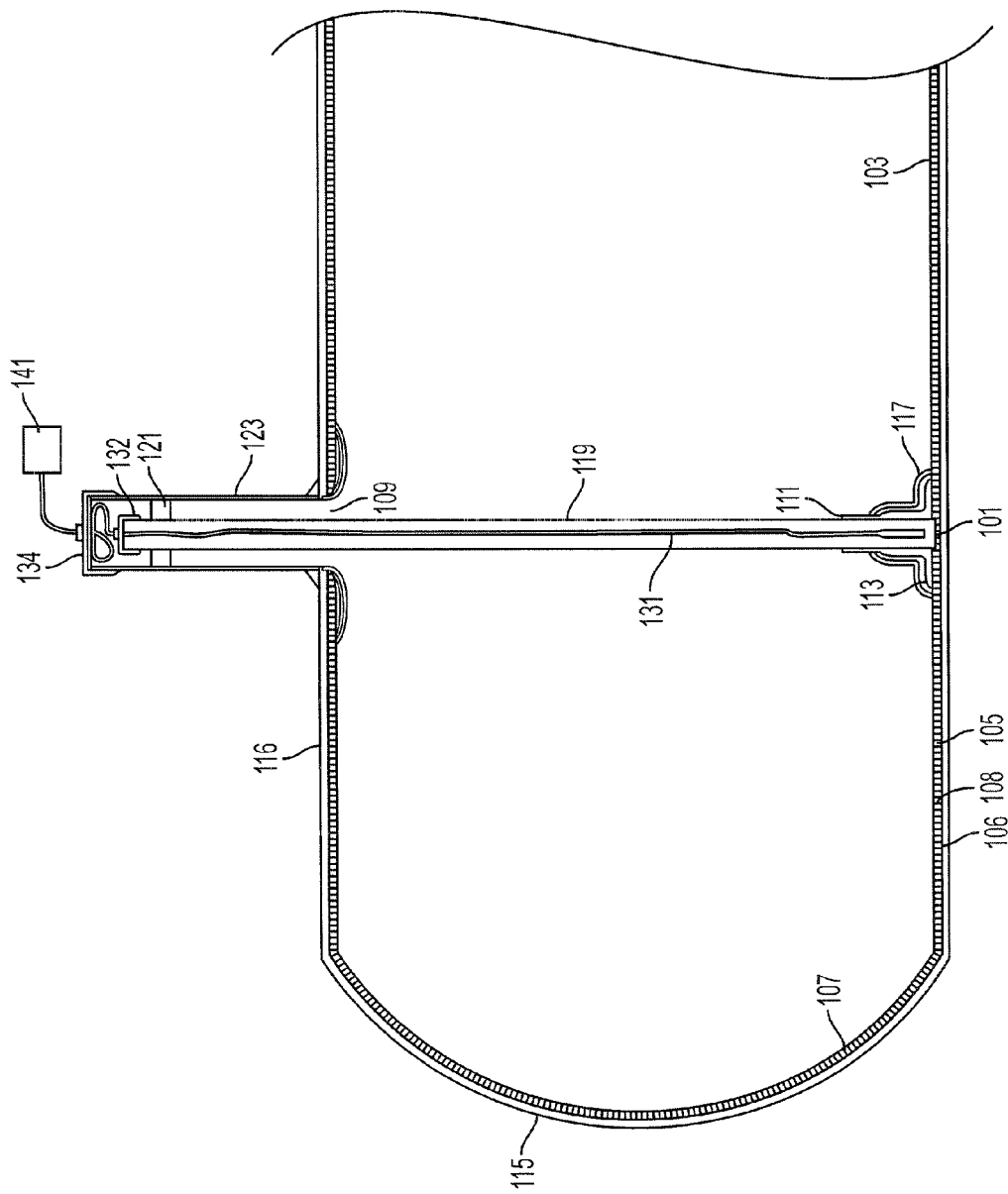
FIG. 1 shows a cross-sectional view of a first embodiment of a monitoring system assembled in a tank.

First, embodiments of the invention are specifically described with respect to FIGS. 1 and 2. In these embodiments, the apparatus comprises a coupling (111), a tube (119), and a bushing (121), generally holding the tube (119) in place and apart from a storage tank (115). Additional elements may be added to the apparatus to interface with specific monitoring equipment, as is shown in these FIGS. As discussed below, the FIGS. show the apparatus in fluid communication with an interstitial space (105) between two walls of a multi-layered tank lining. Embodiments of the invention also include methods of use of an apparatus, for example, as shown in FIGS. 1 and 2, for the monitoring of the integrity of the interstitial space between two walls of a storage tank. The methods of use of such an apparatus include so-called wet or dry monitoring, or pressure monitoring (including vacuum monitoring) of the interstice to which the apparatus is connected.

The systems and methods of the invention are particularly useful for monitoring the integrity of a multi-layered inner lining (107) of an underground storage tank, especially a tank that has been retrofitted with such an inner lining (107). A method of retrofitting tanks has been described in U.S. Pat. No. 5,904,265 (which is entirely incorporated herein by reference), which includes an inner lining comprising a multi-layered fabric having an interstitial space (105) between two generally parallel layers of fabric (103 and 106), the layers being supported at a distance from one another by generally perpendicular fabric pylons (108), all of which is reinforced and hardened by a resin polymerization. An example of such a lining is that of the commercial product known as PARABEAM® (three dimensional glass fabric). By monitoring the interstitial space (105) of such a lining, the integrity of the walls of the lining can be monitored. When the integrity of the walls of the lining is breached, the contents of the interstitial space (105) may change. Detection of such a change is generally indicative of the breach and of the need for remedial action.

Components and connections of the embodiment of FIG. 1 are described below in connection with a method of assembling the apparatus While this figure is illustrative of the use of the apparatus in connection with a multi-layered inner liner with its own interstice, a similar assembly can be performed in connection with other structures forming an interstice, such as what is commonly referred to in the industry as a double-walled tank. To assemble the apparatus shown in FIG. 1:

First, cut and remove an approximately one and one-half inch, generally circular area (101) from the top layer (103) of the inner lining (107) (e.g., PARABEAM®, or three dimensional glass fabric, material), thereby exposing the interstice (105) to the inner volume of the tank (115). This circular opening (101) should be located on the tank bottom directly below a four-inch entry bunghole (109) at the top of the tank (115).

Then, obtain a coupling (111) having an attached flange portion (113) and an approximately two inch opening. Place a bead of hot glue around the perimeter of the bottom of the flange (113) of the coupling (111) Set the coupling (111) in place on top of the inner lining (107) above the cut out area (101) so that there is fluid communication between the interstice (105) below the cut out area (101) and the opening of the coupling (111), securing the coupling (111) with the glue to the inner lining (107) over the cut out area (101), approximately centered thereon.

Next, further secure the coupling (111) to the inner lining (107) by applying several layers, preferably four layers, of resin soaked flexible material, such as one and one-half ounce chopped strand material, and cure the resin to create a support (117) over the flange (113) and adjacent inner lining (107) surface.

Measure, cut, and bevel the ends of a two inch diameter fiber reinforced polymer (FRP) tube (119) to sufficient length to extend from within the two-inch diameter flanged coupling (111) to near the top of a four-inch riser pipe (123) Insert the tube (119) into the tank (115) thlough the riser (123). Using an FRP glue compatible with the liquid to be contained in the tank (115), secure one end of the tube (119) into the coupling (111), which is attached to the tank (115) bottom, while the other end of the tube (119) extends into the riser (123).

Next, slide an approximately four inch diameter and approximately two-inch deep neoprene bushing (121) having an appropriately dimensioned center hole (approximately two-inch diameter) through its depth so as to fit snuggly around the outer diameter of the top of the tube (119), and push the bushing (121) onto the tube (119) until it rests at least about two inches below the beveled top portion of the tube (119).

After the bushing (121) is in place, the tube (119) can be coupled to a monitor device (141), such as either of an electrical fluid level detector as shown in FIG. 1, or an air pressure source, as shown in FIG. 2. The tube (119) length should be measured to allow an appropriate space within the riser (123), if needed, for coupling to the monitor.

The dimensions provided above for each of the components of the apparatus of an embodiment of the invention are not critical to its proper operation and may vary over a wide range. For instance, tubes (119) smaller than one inch in diameter and larger than four inches in diameter could be used, as well as can any diameter in-between. Because in an embodiment the components should fit together to provide a sealed channel between the interstitial space and an element of the monitoring equipment, each of the dimensions of the components should scale appropriately as, for instance, the tube (119) dimensions change.

An important feature of the apparatuses shown in FIGS. 1 and 2 is the possibility of variation in the positioning of the tube (119) relative to the tank (115), especially within the riser (123), such variation being made possible in these embodiments by the bushing (121), Particularly because of the possibility of flex in the tank walls or in the tube (119), especially resulting from the varying forces applied as the tank is drained and refilled, the top (116) of the tank (115) may move up-and-down relative to the height of the tube (119), or the tube (119) may move side-to-side within the riser (123), In particular, because the connection between the bushing (121), the tank (115), and the tube (119) is a pressure fit in this embodiment, this connection allows for up-and-down movement of the tube relative to the tank. As well, because of the flexibility of the bushing material, the side-to-side movement is allowed.

Whereas the bushing (121) is made of a neoprene material in the above described example, it could be made of other suitable materials that would essentially seal the space between the tube (119) and the riser pipe (123), yet allow for some relative movement of these elements, Further, none of the materials described for any of the components in the above example is critical to the operation of the apparatus, but materials chosen should allow the functionality described or inherently presented herein (e.g., generally inert to attack by liquid petroleum products when the tank is to be used for storage thereof). As a still further example, the tube (119) need not be of an FRP construction, and need not be rigid.

In an alternate embodiment shown in FIG. 3, the bushing (121) is absent. In the construction of this embodiment, the tube (119) must be held steady while it is connected to the coupling (111) and while such connection is secured via application and curing of the resin impregnated fibrous material support (117). After securing the tube (119) at the coupling (111), the tube (119) may be released to essentially float free within the riser (123) or the tank (115). The embodiment shown in FIG. 3 allows for the same variation in the positioning of the tube (119) relative to the tank (115) as is described above with respect to the embodiments shown in FIGS. 1 and 2.

The apparatuses assembled as shown in either of FIGS. 1-3 are useful for allowing the monitoring of the integrity of the inner lining of the tank. Monitors can be connected to the interstitial space of a dual-walled inner lining through connection to or through the tube (119) and the coupling (111) and the cut out area (101). As shown in FIG. 1, the connection between the monitoring system, the tube (119), and the tank (115) includes a tube cap (132) and a riser cover (134). A monitoring system in FIG. 1 includes a sensor lead and probe (131), connected to the interstitial space through the tube (119), that may allow discovery of a breach in the integrity of the lining upon the passage of a liquid through the breach and into the interstice where the probe is located.

Where this dry monitoring method is to be used, i.e., the detection of liquid in an otherwise dry interstice, the probe should be located at a low point in elevation with respect to the rest of the interstice so that gravity will pull any liquid in the interstice to that low point. This can be most readily accomplished when the cut out (101) is directly adjacent to and vertically above such a low point in the interstice (105).

In the embodiment shown in FIG. 2, the apparatus includes a male adaptor (125) for connecting the tube (119) to monitoring equipment outside of the tank (115). In this case the monitoring system includes a pressure gauge (143), a pressure relief valve (144) and a pressure regulator (145). In this embodiment, the male adapter (125) makes an air-tight seal between the tube (119) and the monitoring equipment. Whether the interstice (105) is pressurized or depressurized relative to ambient air pressure external to the tank (115), a breach of the integrity of the interstice may result in a pressure change therein that can be detected.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention. For example, an embodiment in which the interstice is not part of an inner multi-layered fabric, but is created by a so-called double-walled tank structure, is also encompassed by this specification.

The invention claimed is:

1. A method of monitoring the integrity of a storage tank comprising:
   providing a double-walled tank having:
      an inner wall;
      an outer wall;
      an interstice between the inner wall and the outer wall; and
      a riser pipe;
   providing a tube having two ends with a length therebetween;
   rigidly connecting one end of said tube to said doubled-walled tank by attaching only a first of said two ends to said inner wall;

having an internal volume of said tube be in fluid communication with said interstice; and monitoring the contents of said interstice using monitoring equipment connected to said interstice through said tube.

2. The method of claim 1 wherein said connecting comprises connecting said tube at one end to said inner wall at a position adjacent to a location in said interstice that is designed to be a low point in elevation.

3. The method of claim 1 wherein said monitoring includes monitoring the pressure of said interstice relative to ambient air pressure.

4. The method of claim 1 wherein said monitoring includes detecting the presence of a liquid.

5. The method of claim 1 wherein said monitoring includes detecting a change in the level of a liquid.

6. The method of claim 1 wherein said interstice is created by retrofitting an existing tank with an inner wall not present at the time said tank was originally manufactured.

7. A method of monitoring the integrity of a storage tank comprising:
   providing a double-walled tank having:
      an outer wall;
      a liner creating an inner wall;
      an interstice located between the outer wall and the liner;
      a riser pipe;
      a cut out area in the liner; and
      a coupling attached to the liner at the cut out area so there is fluid communication between the interstice and the coupling;
   providing a tube having an internal volume and two ends with a length therebetween;
   rigidly connecting one end of said tube to said doubled-walled tank by attaching only a first of said two ends to said coupling so the internal volume of said tube is in fluid communication with said interstice;
   allowing the second of said two ends to freely extend into the riser without further attachment to the double-walled tank; and
   monitoring the contents of said interstice using monitoring equipment connected to said interstice through said tube.

8. The storage tank of claim 7 wherein said first end is connected to said coupling at a position adjacent to a location in said interstice that is designed to be a low point in elevation.

9. The storage tank of claim 7 wherein said monitoring equipment monitors the pressure of said interstice relative to ambient air pressure.

10. The storage tank of claim 7 wherein said monitoring equipment detects the presence of a liquid.

11. The storage tank of claim 7 wherein said monitoring equipment detects a change in the level of a liquid.

* * * * *